F. H. LUKE & C. R. MILLAR.
VALVE AND TAP.
APPLICATION FILED JUNE 27, 1917.
1,252,910.
Patented Jan. 8, 1918.
Fig.2.
Fig.1.
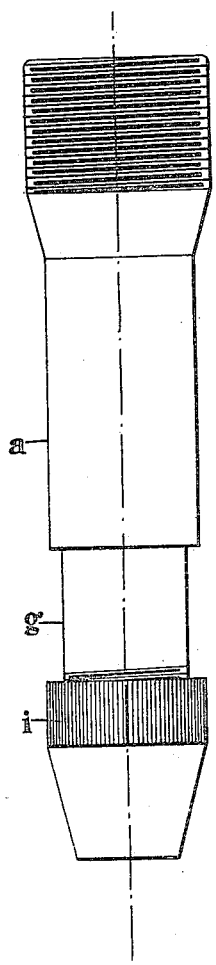
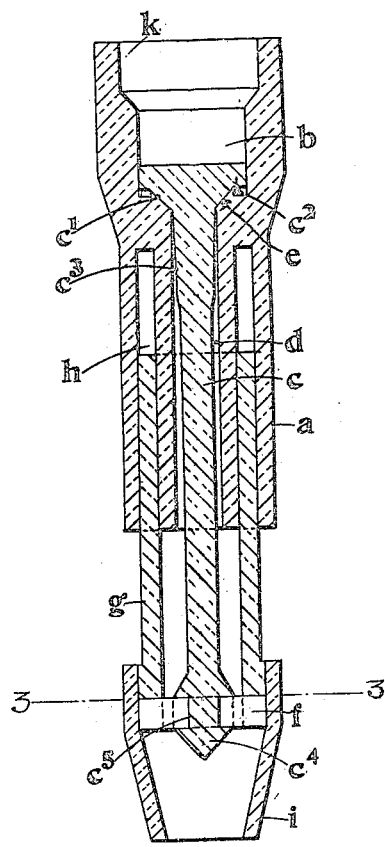
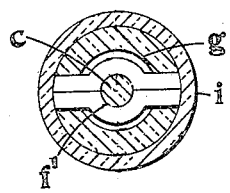
Fig.3.
Inventors
F. H. Luke
C. R. Millar
by
W. E. Evans
Attorney.

UNITED STATES PATENT OFFICE.

FRANK HENRY LUKE AND CHARLES ROBERT MILLAR, OF TARQUAH, GOLD COAST COLONY, AFRICA.

VALVE AND TAP.

1,252,910.  Specification of Letters Patent.  Patented Jan. 8, 1918.

Application filed June 27, 1917. Serial No. 177,368.

*To all whom it may concern:*

Be it known that we, FRANK HENRY LUKE, a citizen of the American Republic, and CHARLES ROBERT MILLAR, a subject of the King of Great Britain and Ireland, both residing at Tarquah, in the Gold Coast Colony, Africa, have invented certain new and useful Improvements Relating to Valves and Taps, of which the following is a specification.

This invention relates to lift valves applicable to water taps and for similar purposes and has for its object to provide a valve and tap of simple construction, that is simply opened, that is self-closing and that is adapted effectively to prevent shock in the service pipes and damage due to the too sudden shutting off of the supply.

According to the invention we provide the valve in closing to cut off the supply and to inclose a quantity of water within a space the outlet from which is gradually contracted in the final stages of closure of the valve, so that thus an elastic or cushion resistance is set up to the movement of the valve in closing by which undue shock in the service pipes is prevented.

According to the invention, moreover, the valve is adapted to be opened by a simple upward or inward movement of the valve stem and its closure is effected under the service pressure or under the action of gravity without the employment of springs and without the employment of any means within the tap for holding the valve in its open position. Thus the careless or wilful waste of water may be prevented.

Furthermore according to the invention the lift valve which is of the ordinary mushroom type closing upon a seat, is provided as a piston valve adapted to move within a corresponding cylindrical space within the casing or tap, while the stem of the valve is formed so that the central outlet from the space beneath the valve in the final stages of closure contracts for the purpose described.

According to the invention again the tap or casing is provided with an outlet pipe of cylindrical form to which the valve stem is connected at its lower end and this outlet pipe is adapted to slide within a corresponding annular space provided in the casing or tap and may have mounted upon its outer or lower extremity an outlet nozzle by means of which the valve may be opened. Thus the valve is guided in its movement by a pipe that at the same time serves for the outlet passage.

By such means a tap is provided of simple construction, that may be readily taken apart for repair, that is effective in preventing shock in the service pipe, that is self-closing and is especially adapted for operating in a vertical position.

The invention comprises the construction which is hereinafter described.

The invention is illustrated in the accompanying drawings in which—

Figure 1 is a sectional elevation of a water tap constructed according to the invention;

Fig. 2 is an elevation corresponding to Fig. 1, and

Fig. 3 is a section on the line 3—3 of Fig. 1.

In carrying the invention into effect according to one construction, we provide a casing or tap consisting of a tubular member $a$ having within it at its upper extremity a cylindrical space or cavity $b$ for the reception of the valve $c$. This cylindrical space or cavity $b$ communicates with a central passage $d$ of smaller diameter formed beneath it and extending to the lower end of the tap or casing. This central passage $d$ is formed of circular sectional shape and at its upper extremity where it communicates with the cylindrical space for the valve, a conical seat $e$ is provided for the reception of the valve $c$.

The valve $c$ operates as a lift valve and is provided with a conical face $c^1$ on its under side to rest within the conical valve seating $e$ provided for its reception in the tap or casing, while the rim $c^2$ of the valve is provided of cylindrical form to fit within the cylindrical space or cavity $b$ provided in the casing or tap as aforesaid. The stem of the valve $c$ at the part $c^3$ immediately adjoining its conical face $c^1$ is provided of a gradually tapered form, the diameter of the stem gradually decreasing toward the lower end. The stem of the valve $c$ may, however, for the main part of its length be further reduced and at its lower extremity it may be provided with an enlargement $c^4$ in which an annular groove $c^5$ is formed in a plane transverse to the vertical axis of the valve, for the reception of a cross bar or member $f$ by which the end of the valve stem is connected to and carried by a sliding sleeve $g$ serving as the outlet pipe. The sliding sleeve $g$ extends upwardly into the tap, an annular recess $h$ of a corresponding shape being provided for its reception in the lower part of the tap. This recess $h$ extends upwardly a considerable part of the length of the tap to a distance short of the cylindrical valve space $b$, so that thus even in the closed position of the valve indicated in Fig. 1 a substantial part of the sleeve $g$ still remains within the annular space $h$ in the tap, and thus the valve $c$ is effectively supported against lateral displacement and the truly vertical movement of the valve $c$ is insured. By such means also the depth of the cylindrical rim $c^2$ of the valve $c$ may be reduced to a small dimension.

The lower end of the valve stem may be connected to the lower end of the sliding sleeve $g$ or outlet pipe by means of a nozzle $i$. The cross bar $f$ is provided of two symmetrical parts each provided with a semi-circular central part $f^1$ having a semi-circular recess so that when the two parts forming the cross bar are brought together to engage the lower end of the valve stem, the semi-circular central parts come to lie within the annular groove $c^5$ provided in the enlarged end $c^4$ of the valve stem. The respective parts of the cross bar $f$ extend at each side to lie against the inner wall of the nozzle passing through recesses of corresponding shape formed in diametrically opposite positions near the lower edge of the sliding sleeve or outlet pipe $g$, and these respective parts may be screw threaded with threads of a pitch corresponding to the internal screw threads provided at the upper end of the nozzle $i$. By such means the nozzle $i$ may be screwed into position upon the lower end of the sliding sleeve or outlet pipe $g$ and at the same time engage the cross bar $f$ and thus effectively secure the valve stem to the lower end of the sliding sleeve or outlet pipe. The nozzle $i$ may have its periphery milled so that it may be readily unscrewed and its lower end may be contracted.

In operation it will be understood that the pressure of the water or liquid acting upon the upper end of the valve $c$ maintains the valve with its conical face $c^1$ upon the conical seating $e$. On the nozzle $i$ being lifted carrying with it the sliding sleeve or outlet pipe $g$ and the valve stem, the valve $c$ is carried upwardly to the upper end of the cylindrical space or cavity $b$ in Fig. 1. This cylindrical space or cavity $b$ at its upper end opens out into a space $k$ of larger diameter so that as the valve $c$ moves upwardly out of this cylindrical space $b$ the water enters the cylindrical space $b$ and flows out through the central passage $d$ in the tap and through the annular space between the valve stem and the outlet pipe $g$ and thence through the nozzle $i$. On the nozzle $i$ being released, the weight of the valve $c$ and the pressure upon the top of the valve causes it to descend. As the valve $c$ enters the cylindrical space $b$ at the upper end of the tap the supply of water is cut off by the cylindrical rim $c^2$ of the valve, a quantity of water being thus confined under the valve $c$ within the cylindrical space. On the further movement of the valve toward its seating $e$, the annular space through which the water beneath the valve may pass out becomes less by reason of the conical formation of the upper end of the valve stem at $c^1$ and $c^3$. A resistance is thus set up to the too rapid movement of the valve $c$ in the final stages of closure under the service pressure, so that thus undue shocks or damage to the service pipes is prevented.

It will be noted that the shape or conformation of the valve stem $i$. $e$. its tapering feature, is continued some distance, and that near the lower end of said stem there is provided a conical swelling or enlargement, above the groove $c^5$, to spread or divert any descending stream into the substantially annular space or opening between the valve stem enlargement and the inside of the sliding sleeve $g$. The lower part of the enlargement $c^4$ is also conical, in reverse of the upper cone, the two forming a double cone; and this general construction, together with the more or less conical nozzle $i$, facilitates the escape of the stream without unnecessary gurgle or noise.

Such a construction involves the use of a small number of parts which can be readily assembled and disconnected for repair. The tap may be connected to the service pipe at its upper extremity and the upper extremity may be screw threaded for the purpose.

The invention is not limited to the construction immediately before described.

We claim:—

In a self-closing tap, in combination, a cone-shaped valve, a tubular member having a seat for said valve, there being an opening through said seat, a stem for said valve, the upper part of said stem being as large as the opening and having a portion gradually tapering to smaller dimension, a double cone-shaped enlargement at the lower part of said stem, a sliding sleeve, larger than said enlargement, adapted to slide upon said tubular member, means connecting said sleeve and enlargement at the middle thereof, and an inwardly tapering nozzle on said sleeve, the whole arranged to facilitate the discharge of water with avoidance of gurgle.

FRANK HENRY LUKE.
CHARLES ROBERT MILLAR.